Aug. 26, 1930.  J. C. BECKFIELD  1,774,349
APPARATUS FOR DISPENSING LIQUIDS IN MEASURED QUANTITIES
Filed Nov. 10, 1928
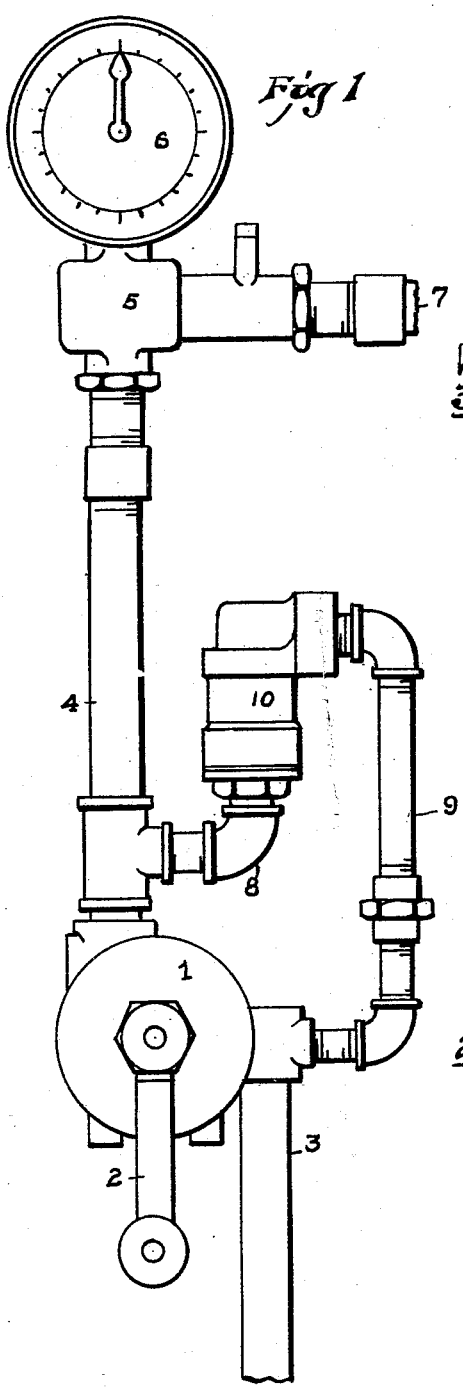
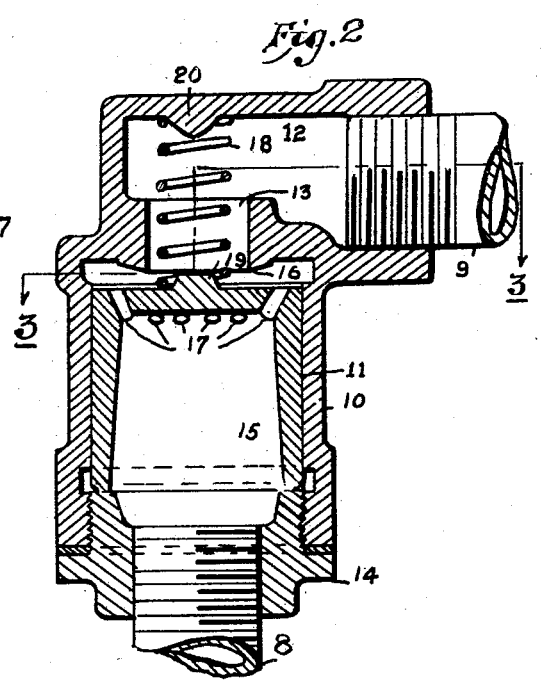
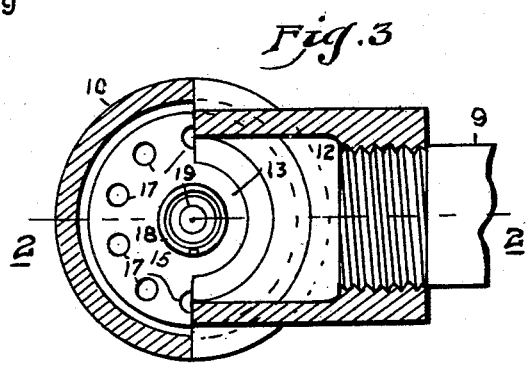
INVENTOR
John Charles Beckfield
by Edward A. Lawrence
his attorney.

Patented Aug. 26, 1930

1,774,349

UNITED STATES PATENT OFFICE

JOHN CHARLES BECKFIELD, OF PITTSBURGH, PENNSYLVANIA

APPARATUS FOR DISPENSING LIQUIDS IN MEASURED QUANTITIES

Application filed November 10, 1928. Serial No. 318,348.

Liquids, such for instance as gasoline, oil and the like, are generally dispensed in measured quantities by being pumped or otherwise discharged through a conduit provided with a meter.

The meters now in general use for such purposes will either not register at all or fail to register accurately when the discharge flow falls below a certain rate.

Thus the ordinary gasoline pump meter either fails to register the flow or registers the same inaccurately when the flow falls below about four gallons a minute.

This fact provides opportunity for a dis15 honest attendant to dispense gasoline without having to account for the same, and an accurate account cannot be kept of the sales made by an honest attendant.

This is particularly true when the pumps are operated by hand.

The purpose which I have in view is to prevent these abuses.

This I accomplish by by-passing around the pump all liquid whose flow is at a rate below that which the meter may accurately register, and which rate for convenience I term the "minimum flow." Thus, assuming that the flow must be at a rate of not less than four gallons per minute, I by-pass around the pump all liquid flowing from the pump at a lower rate, so that such liquid will not pass through the meter or be dispensed to the customer.

For the accomplishment of this purpose I provide the pump with a by-pass conduit which connects at one end to the discharge of the pump and at the other end to the liquid supply of the pump; and I provide such bypass with an automatic valve which opens and remains open when and while the flow from the pump is less than the predetermined rate, say four gallons per minute, thus bypassing the liquid discharged by the pump back to the supply; but which closes and remains closed when and while the flow reaches and exceeds such minimum so that the liquid passes through the meter and out of the dispensing conduit.

I provide a novel and practical automatic valve for this purpose.

Other novel features of construction, and also arrangement of parts will appear from the following description.

In the accompanying drawings, wherein I have illustrated a practical embodiment of the principles of my invention, Fig. 1 is an elevation showing a hand operated gasoline pump together with its supply conduit, the meter, the dispensing conduit, the by-pass and automatic valve.

Fig. 2 is an enlarged vertical section of the automatic valve taken along the line 2—2 in Fig. 3.

Fig. 3 is an irregular horizontal section taken along the line 3—3 in Fig. 2.

Referring to the drawings, 1 represents a rotary pump which is shown as hand driven by the crank 2.

3 represents the intake conduit of the pump which is connected in the usual manner to the gasoline or other liquid supply.

The discharge side of the pump is connected to the dispensing conduit 4 having interposed therein the meter 5 whose dial is shown at 6.

The outer end of the conduit 4 is shown connected to the usual hose 7.

Arranged around the pump is a by-pass conduit shown as comprising the pipe 8 which connects with the dispensing conduit 4 adjacent to the discharge side of the pump 1 and the pipe 9 which connects to the supply conduit 3 preferably close to the intake of the pump 1.

The pipes 8 and 9 are connected together through the automatic valve whose casing is shown at 10 and which closes towards the pipe 9.

The valve is arranged to open when and remain open while the rate of flow from the pump is below the predetermined minimum, and to close and remain closed when and while the rate of flow exceeds the minimum.

I have shown a suitable and practical type of valve for this purpose which is of the following construction.

The casing 10 comprises a vertically disposed cylindrical bore 11 and above the same the horizontally disposed neck 12, the bore and neck being connected by the circular port 13 disposed on a vertical axis.

The lower end of the bore 11 is interiorly threaded to receive the end of the coupler nut 14 which connects the pipe 8 to the casing.

The pipe 9 is screwed into the threaded outer end of the neck 12.

In the bore 11 is mounted for vertical movement the inverted cup plug 15, which when raised closes the port 13 by contact of its top wall with the annular knife edge 16 concentric with said port.

The interior cavity of the cup preferably upwardly contracts to a slight degree.

The cup 15 has its top wall provided with an annular series of ports 17 disposed adjacent to the perimetral edge of said wall.

A relatively light spring 18 is interposed between the top of the cup and the upper wall of the neck, being held in position by the boss 19 of the cup and the boss 20 of the neck.

The function of the spring is to insure the dropping of the cup when the pressure within the cup falls to the predetermined minimum.

When the pump is operated, the pipe 8 of the by-pass, being of lower level than the meter and the delivery end of the dispensing conduit, is kept filled with liquid and if the rate of flow and consequently the pressure in the cup 15 is too small to lift the cup and thus seal the port 13, the cup will remain in its low position, illustrated in Fig. 2, supported on the top of the nut 14, and the liquid will flow upwardly through the ports 17 and the port 13 into the neck 12 and thence through the pipe 9 back into the supply conduit 3, thus by-passing the liquid pumped by the pump 1 back to the intake side of the pump.

Should however the rate of flow increase so that the ports 17 are unable to accommodate the liquid from the pump, the cup 15 will be elevated by the pressure of the liquid, sealing the port 13 and thus causing the liquid output of the pump to flow up through the conduit 4, the meter 5 and the dispensing hose 7.

In case the outflow of the pump fluctuates above and below the predetermined rate of flow, the cup 15 will rise and fall with the liquid pressure, opening in the presence of a rate of flow too low to be properly registered by the meter and by-passing the liquid, but closing when the pump rate rises above the minimum so that the pumped liquid is dispensed through and registered by the meter.

In the case of a valve plug having an upper internal diameter of one and seven-eighths of an inch I have found that a provision of about twelve ports 17 of a quarter of an inch diameter is sufficient to obtain a proper operation of the by-pass.

It is thus evident that all of the liquid dispensed will be properly registered by the meter, and loss of return either owing to dishonesty or otherwise will be prevented.

What I desire to claim is:—

1. In liquid dispensing apparatus, the combination with a pump, a liquid supply for said pump, a dispensing conduit connected to the outlet of the pump and a measuring meter in said conduit, of means for returning the pumped liquid to the supply without passing it through the meter when the rate of flow is less than that which may be properly registered by the meter.

2. In liquid dispensing apparatus, the combination with a pump, a liquid supply connected to the intake of said pump, a dispensing conduit connected to the outlet of the pump and a meter interposed in the dispensing conduit, of a by-pass around the pump arranged to return the liquid from the pump to the liquid supply when the rate of flow is too low to properly register on the meter.

3. In liquid dispensing apparatus, the combination with a pump, a liquid supply connected to the intake of said pump, a dispensing conduit connected to the outlet of the pump and a meter interposed in the dispensing conduit, of a by-pass conduit connecting the dispensing conduit to the supply, and an automatic valve in said by-pass conduit arranged to be open when the rate of flow of the liquid from the pump is too low to properly register on the meter but to close when said rate exceeds said minimum.

Signed at Pittsburgh, Pa., this 8th day of November, 1928.

JOHN CHARLES BECKFIELD.